United States Patent [19]
Haaker et al.

[11] Patent Number: 5,319,749
[45] Date of Patent: Jun. 7, 1994

[54] CIRCUIT ARRANGEMENT FOR GEOMETRIC IMAGE TRANSFORMATION INCLUDING A MEMORY STORING AN ASSIGNMENT BETWEEN ADDRESSES IN INPUT AND OUTPUT IMAGES

[75] Inventors: Paul R. Haaker, Hamburg; Erhard P. A. Klotz, Halstenbek; Reiner H. Koppe, Hamburg; Rolf E. Linde, Haseldorf; Karsten P. Hansen, Hamburg, all of Fed. Rep. of Germany

[73] Assignee: U.S. Philips Corporation, New York, N.Y.

[21] Appl. No.: 899,814

[22] Filed: Jun. 16, 1992

Related U.S. Application Data

[63] Continuation of Ser. No. 452,871, Dec. 19, 1989, abandoned.

[30] Foreign Application Priority Data

Dec. 22, 1988 [DE] Fed. Rep. of Germany ....... 3843232

[51] Int. Cl.⁵ .............................................. G06F 15/62
[52] U.S. Cl. .................................... 395/166; 395/125; 395/133; 395/136; 395/162; 395/164; 364/413.13
[58] Field of Search ................. 364/518–522, 364/413.13, 414, 413.13; 378/99; 395/119, 120, 121, 125, 128–130, 133, 136–141, 162–166

[56] References Cited

U.S. PATENT DOCUMENTS

| | | | |
|---|---|---|---|
| 3,499,146 | 3/1970 | Richards | 250/61.5 |
| 3,745,345 | 7/1973 | Muehllehner | 250/71.55 |
| 4,682,217 | 7/1987 | David et al. | 395/125 X |
| 4,736,399 | 4/1988 | Okazaki | 378/99 |
| 4,833,625 | 5/1989 | Fisher et al. | 364/518 |
| 4,860,217 | 8/1989 | Sasaki et al. | 395/125 |
| 4,870,692 | 9/1989 | Zuiderveld et al. | 382/6 |
| 4,965,726 | 10/1990 | Heuscher et al. | 364/413.13 X |

OTHER PUBLICATIONS

"Variable Core-Size Linear Transformation Program", IBM Technical Disclosure Bulletin, vol. 14, No. 10, Mar. 1972.

Primary Examiner—Gary V. Harkcom
Assistant Examiner—Almis Jankus
Attorney, Agent, or Firm—Jack D. Slobod

[57] ABSTRACT

A memory arrangement for fast geometric transformation of an image is formed by a first memory for storing image values generated by an image-generating system, a second memory for storing image values corresponding to an image resulting from geometric transformation of image values from the first memory, and a third memory with the same number of memory addresses as the second memory and in which an assignment between the addresses of the first and second memories is stored.

16 Claims, 1 Drawing Sheet

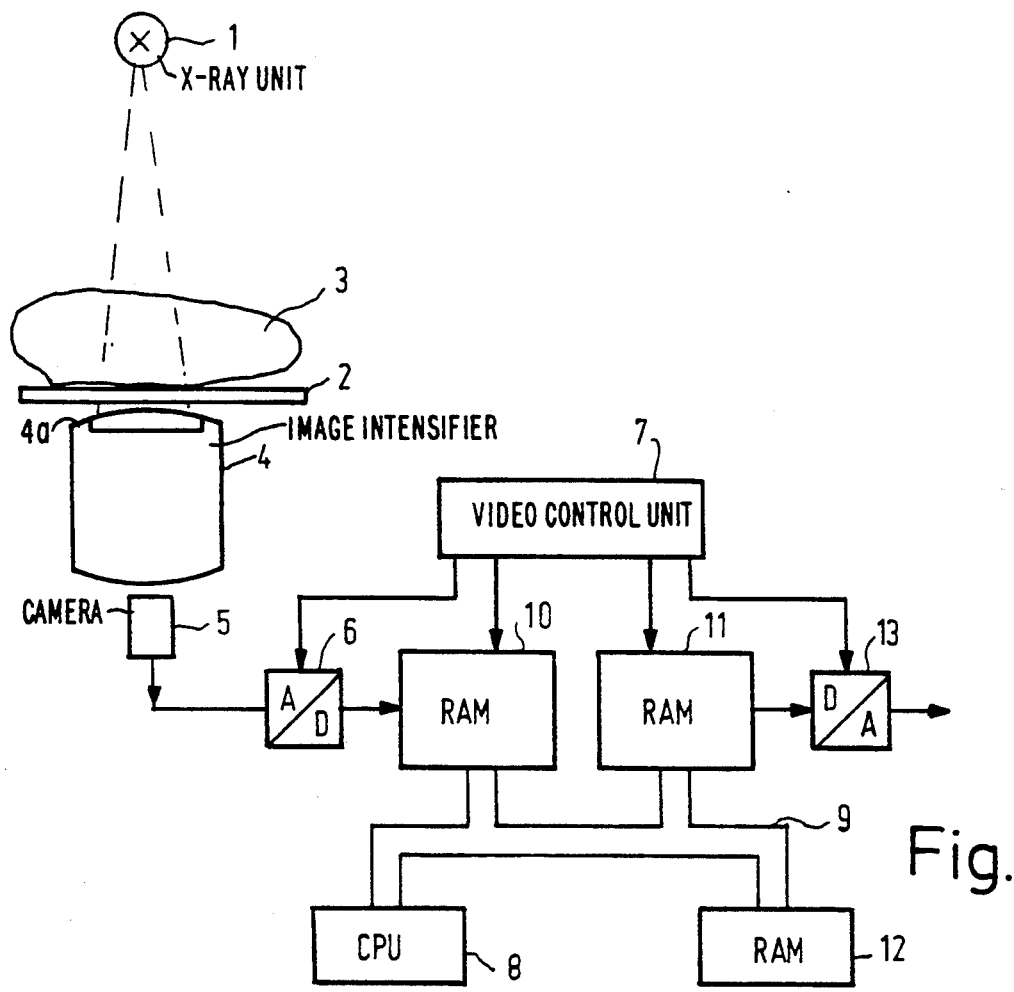
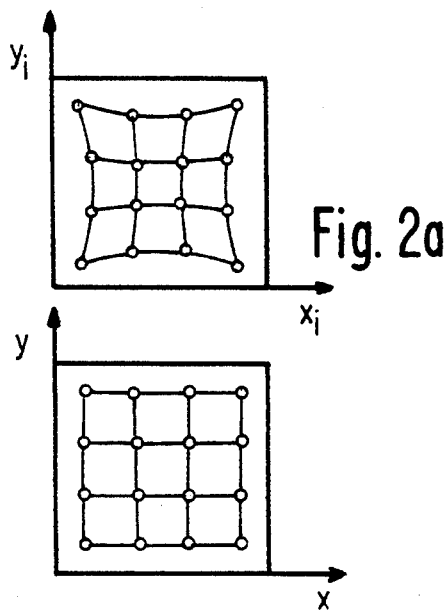
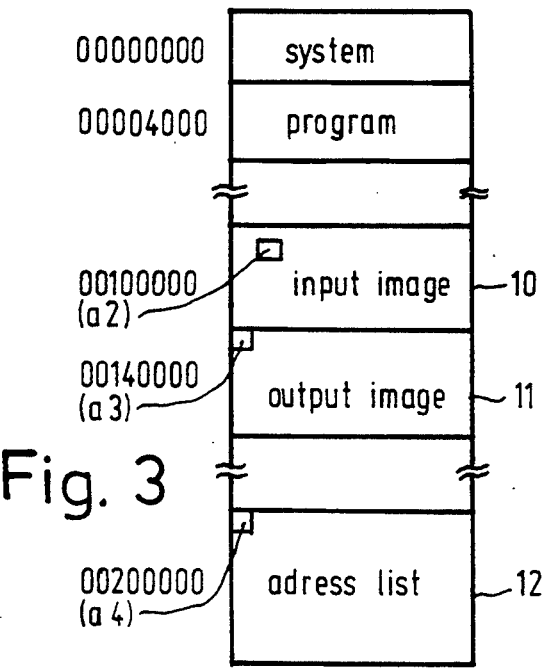

CIRCUIT ARRANGEMENT FOR GEOMETRIC IMAGE TRANSFORMATION INCLUDING A MEMORY STORING AN ASSIGNMENT BETWEEN ADDRESSES IN INPUT AND OUTPUT IMAGES

This is a continuation of application Ser. No. 07/452,871, filed Dec. 19, 1989, now abandoned.

The invention relates to a circuit arrangement for geometric image transformation for an image generating system, which supplies a sequence of digital image values which are stored in a memory arrangement.

A problem often arises in image processing of geometrically transforming an image generated by an image-generating system. For example, in the case of image-generating systems which supply distorted images, it is usually necessary to transform this distorted image into an undistorted image. Such image distortions may be produced, for example, in an X-ray image intensifier/television chain as a result of the curvature of the input screen of the X-ray image amplifier.

It is known from German Offenlegungsschrift 3,419,043 that it is possible to eliminate the distortion in the reproduction of an image distorted in this way by varying the deflection voltages of the playback monitor in such a way that the image reproduced appears to be undistorted.

In many cases, however, it is not sufficient to achieve an undistorted reproduction, but rather it is necessary to eliminate the distortion in the image which is supplied to the playback device in such a way that distortion elimination is no longer required for the reproduction. For example, U.S. Pat. No. 3,499,146 and German Offenlegungsschrift 3,237,572 describe tomography processes in which several X-rays of an object are made from different perspectives. The image values of these X-rays are stored in a memory arrangement. To generate tomographs, the image values are combined which are geometrically assigned in the individual X-rays to the same image point within a layer. The prerequisite for this is undistorted X-rays.

Described in the Journal IEEE Comp. in Cardiology, Boston, Oct. 7-10, 1986 (1987) is an image transformation method which would make it possible to carry out the known methods even if the image-generating system with which the X-rays are produced supplies only distorted X-rays. This method sorts the stored image values of an X-ray in such a way that they are stored under the same memory addresses in which they would be stored if the image-generating system did not distort. In this method, the assignment between the coordinates in a distorted image and the coordinates in an undistorted image are calculated for each image point by means of a polynomial and the image values are sorted in accordance with this calculation. As this calculation must be carried out for each image point, relatively long computing times result for the transformation—even if the basic polynomial for the computation contains only comparatively few elements and the transformation is thus comparatively inexact.

The object of the present invention is to carry out the image transformation in another manner.

This object is achieved according to the invention in that the memory arrangement contains a first memory for storing the image values generated by the image-generating system, in that a second memory is provided in which the image values corresponding to the image transformation are stored, and in that a third memory with the same number of memory locations as the second memory is provided, in which the assignment between the addresses of the first and second memory is stored.

Three memories are employed by the invention. The image supplied by the image-generating system, which is to be transformed and is, for example, distorted, is stored in the first memory. The transformed image (with distortion eliminated) is stored in the second memory, that is the image values are stored therein under such addresses that an undistorted image is produced when they are read out—with the usual address sequence. The assignment between the addresses of the first and second memory is stored in the third memory. In the geometric field, this assignment corresponds to a combination of the image point coordinates in the input image and in the transformed image. The contents of this memory thus determines from which image values of the input image (in the first memory) the image values of the output image (in the second memory) are derived. Since a calculation is no longer required for this, the image transformation can be carried out relatively quickly and exactly. Although the assignment stored in memory 3 must be determined once at the outset, it can then however—without recalculation—be used for all geometric image transformations to be carried out with the respective image-generating system for which they were determined.

A preferred further development of the invention envisages that a microprocessor is provided which scans the address space of the second and third memory in each case in a predetermined address sequence, and stores in the second memory under the respective address called the image value which is stored in the first memory under an address which is stored in the third memory under the respective address called. An image value is thus hereby formed for each image point or for each memory location in the second memory, it being possible in some circumstances for one image value from the first memory to be called up several times. In comparison to a system in which each image value in the first memory is assigned to an image point or memory location in the second memory, this has the advantage that gaps (a memory location in the second memory or an image point contains no image value) cannot arise.

The invention is explained in greater detail below with reference to the drawing, in which:

FIG. 1 shows an X-ray system with a device for image transformation according to the invention, FIGS. 2a and 2b show the input and output image during the recording of a test grid, and FIG. 3 shows the memory allocation in an arrangement according to FIG. 1.

In FIG. 1, 1 denotes an X-ray unit which irradiates an object 3 arranged on a table top 2. The modulated X-ray beam thus produced is fed to the input screen 4a of an image intensifier 4, the output image of which, with intensified brightness, is recorded by a television camera 5. The video signal produced in this manner is converted by an analog/digital converter 6 into a stream of digital data words which are stored in a memory 10 under successive addresses. This is controlled by a video control unit 7. The memory 10 is connected via a bus system 9 to a microprocessor 8, which also has access to the memories 11 and 12 via this bus system.

The memory 11 serves for receiving the transformed image (in this case freed of distortions), and the memory 12 contains the assignment between the memories 10 and 11. For this purpose it contains at least as many memory locations as the memory 11 has for receiving the transformed image; however the word length must be sufficient to receive in each case an address in memory 10. If, for example, the two memories 10 and 11 contain 512×512 memory locations (=256 k), then the memory 12 must contain at least as many memory locations, but with a word length of at least 20 bits. If 32 bits are used instead, then a memory capacity of 1 Mbyte is required for the memory 12.

The image values can be read out of the memory 11 by means of the video control unit and fed via a digital/analog converter 13 to a playback unit which is not shown.

Pillow-shaped distortions are caused inter alia, by the curved input screen 4a of the image intensifier 4. These geometric distortions would lead—without the image transformation—to systematic errors in an evaluation of the digitized images.

FIG. 2a shows the input image which is produced when an X-ray of a test grid with square meshing is made with the arrangement according to FIG. 1. The pillow-shaped distortion leads to the grid points not being reproduced on the image points of the X-ray on which they would have been reproduced in a distortion-free recording. As a result, the associated image values in memory 10 are not stored under the addresses under which they would have been stored if the X-ray image amplifier/television chain had exhibited no distortions. The relation between the coordinated $x_i$, $y_i$ in the distorted input image (FIG. 2a) and the coordinates x, y in the undistorted output image (FIG. 2b) or the respective associated addresses in the input memory 10 and in the output memory 11 can be described by the following transformation polynomials for correcting for the non-linear geometric distortion produced:

$$x_i = f_0 + f_1 y + f_2 x + f_3 y^2 + f_4 yx + f_5 x^2 + f_6 y^3 + f_7 y^2 x + f_8 yx^2 + f_9 x^3 \quad (a)$$

$$y_i = g_0 + g_1 y + g_2 x + g_3 y^2 + \ldots + g_9 x^3 \quad (b)$$

The parameters $f_0 \ldots f_9$, $g_0 \ldots g_9$ are then determined according to the method of least error squares (cf., for example, Pratt W.K. "Digital Image Processing", New York 1978, pages 429–432).

The calculations in accordance with equations a) and b) are made once for all image points of the output image or for all addresses of the output image memory, and the addresses resulting therefrom are stored in address memory 12. Distortion is eliminated from all subsequent X-rays by the address space of the output memory 11 and of the address memory 12 being scanned and the image value for the output image being taken from the input memory 10 in each case at the source address contained in address memory 12.

The assembler code of a program required for this and intended for the Motorola 68020 microprocessor is given below. It is assumed here that, as shown in FIG. 3, the memories 10, 11 and 12 are part of a memory arrangement in which the operating system is stored under the (hexadecimal) address 0-3 FFF, the image processing program is stored from address 4000, the input image is stored from address 100,000, the output image is stored from address 140,000, and the addresses are stored from address 200,000. The addresses in the memory areas 10, 11 and 12 are denoted respectively by (a2), (a3) and (a4).

The program is as follows:

```
movea.1 (a4)+,a2(1)
move.b (a2),(a3)+(2)
subq.1#1,d4 (3)
bne.w loop (4)
```

During initialization, the first address of the output image memory 11 is loaded into the address register a3 and the associated address in address memory 12 is loaded into register a4. The data register d4 serves as a loop counter and is loaded at the beginning with the number of processing steps (262,144 for a 512×512 image matrix).

The first instruction copies the contents of the memory location to which register a4 is pointing (a 32-bit value) into the register a2 and at the same time increments the address in register a4 by 1. The value thus transferred into register a2 is the address under which the image value 20 to be transferred is stored in the input image memory 10.—The second instruction copies the data word to which the register a2 is pointing to at that memory location in the output image memory 11 whose address is contained in register a3 and increments the address register a4 by 1. In this way the image transformation for the first image point of the output image is carried out.—The third instruction decrements the contents of the register d4 by 1. The fourth instruction jumps back to the first instruction if the contents of data register d4 are not 0.

The loop with the instructions 1 to 4 is thus executed as many times as image points are present. At the end the image values are assigned to the addresses in the output memory 10 in the same way as with an image-generating system functioning free of distortion. Since no more calculations are required for this, the transformation can be carried out very quickly—in fractions of a second.

In the method described above, each image point in the output image or each memory location of the output memory 11 is assigned an image value from the input memory 10. It may occur thereby that an image value from the input memory 10 is assigned a plurality of image addresses in the output memory 11.—In principle, instead of this it is also possible to scan the addresses of the input memory 10 linearly, and to write into output memory 11 the image value called in each case under an address stored in address memory 12. However, it could also occur that some memory locations in the output image memory 11 are not assigned any image values. The output image would thus have gaps. For this reason, the method discussed above with reference to instructions 1 to 4 is preferred.

The method according to the invention is not only suitable for eliminating distortion in input images with pillow-shaped distortions. In the case of television cameras, geometrically a longer section is scanned in line direction than vertically, for example with a ratio of 4:3. This produces a non-square image point raster. The same is also true of CCD image sensors. This nonsquare image point raster may be transformed—omitting the image values at the edges of the input image—into an image with square image point raster if the remaining image points of a line are expanded in a ratio 4:3, or the associated image values are transferred into the memory locations associated with these image points in the output memory. In principle, this transformation also represents a distortion elimination—by expansion in line direction.

In principle, the invention may however also be used for other geometric image transformations—for example the rotation of an image. In this case, it is likewise only necessary to calculate one single time under which addresses in the input image the image values are stored, which are transferred into the individual memory locations of the output image.

Although the geometric image transformation—in particular the distortion elimination—of X-rays is a preferred field of application of the present invention, it is also possible to transform other images with it.

What is claimed is:

1. A circuit arrangement for geometric transformation of an input image, generated by an image-generating system, into an output image, said input and output images being represented by respective arrays of input and output image values, said circuit arrangement comprising:
    a first memory means for storing the array of input image values at a first set of addresses corresponding to locations of said input image values in the array that represents said input image;
    a second memory means for storing the array of output image values at a second set of addresses corresponding to locations of said output image values in the array that represents said output image;
    a third memory means having a third set of addresses which are in one-to-one correspondence said second set of addresses and having data stored in said third memory means at each address of said third set, said data representing an address of said first set at which said first memory means contains an input image value that in accordance with said geometric transformation equals the output image value at an address of the second set corresponding to said address of said third set; and
    control means for copying to the second memory means input image values from said first memory means by sequentially selecting addresses of said second set in a predetermined address sequence and for each address of said second set selected, reading from the third memory at an address of the third set corresponding to the address of the second set selected, said data representing an address in the first set, reading the input image value from said first memory at said address in the first set represented by said data, and writing said input image value into said second memory at said address of said second set selected.

2. The circuit arrangement of claim 1, further comprising an X-ray unit for generating X-rays, means for supporting an object to be examined by passing through the object the X-rays generated by said X-ray unit, means for generating a video image from the X-rays passing through said object, means for digitizing the video image generated and for causing the video image digitized to be stored in said first memory means as said input image.

3. The circuit arrangement of claim 2, wherein said input image generated by said image-generating system has a geometric distortion such that a rectangular field in an object under examination has been distorted to a pillow-shaped field, and wherein said geometric transformation corrects for said geometric distortion.

4. The circuit arrangement of claim 2, wherein said input image generated by said image-generating system has a geometric distortion and wherein said geometric transformation corrects for said geometric distortion.

5. The circuit arrangement of claim 4, wherein said geometric distortion is a non-linear distortion.

6. The circuit arrangement of claim 4, wherein said geometric distortion is such that a rectangular field in an object under examination has been distorted to a pillow-shaped field.

7. The circuit arrangement of claim 1, wherein said input image generated by said image-generating system has a geometric distortion and wherein said geometric transformation corrects for said geometric distortion.

8. The circuit arrangement of claim 7, wherein said geometric distortion is a non-linear distortion.

9. The circuit arrangement of claim 7, wherein said geometric distortion is such that a rectangular field in an object under examination has been distorted to a pillow-shaped field.

10. A method for geometric transformation of an input image, generated by an image-generating system, into an output image, said method comprising:
    storing in a first memory, a first array of input image values representing the input image generated by the image generating system, said storing being at addresses in said first memory corresponding to locations of said input image values in said first array;
    sequentially selecting each address in a second memory in a predetermined address sequence, said second memory being for storing a second array of output image values representing the output image, said storing being at addresses in said second memory corresponding to locations of output image values in said second array; and
    for each address selected in said second memory:
        reading data from a third memory at an address in one-to-one correspondence with the address selected, said data representing an address in said first memory at which an input image value is stored in said first memory, which input image value, in accordance with said geometric transformation, is to be stored as an output image value in said second memory at the address selected; and
        copying to the second memory at the address selected, an image value from the first image memory stored at the address in the first image memory represented by the data read from the third memory.

11. The method of claim 10, wherein said input image generated by said image-generating system has a geometric distortion and wherein said geometric transformation corrects for said geometric distortion.

12. The method of claim 11, wherein said geometric distortion is a non-linear distortion.

13. The method of claim 11, wherein said geometric distortion is such that a rectangular field in an object under examination has been distorted to a pillow-shaped field.

14. The method of claim 10, further comprising generating a video image in response to X-rays passed through a body, and digitizing the video image to form said input image.

15. The method of claim 14 wherein said video image is rectangular.

16. The method of claim 14, wherein said video image has a geometric distortion such that a rectangular field in an object under examination has been distorted to a pillow-shaped field, and wherein said geometric transformation corrects for said geometric distortion.

* * * * *